A. B. HENDRYX.
METAL KNOB.
No. 190,855. Patented May 15, 1877.
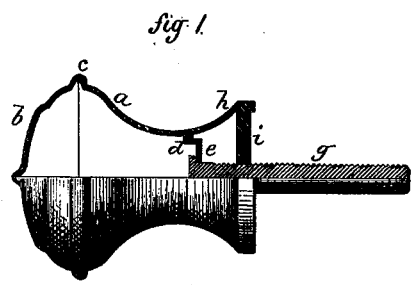

UNITED STATES PATENT OFFICE.

ANDREW B. HENDRYX, OF ANSONIA, CONNECTICUT, ASSIGNOR TO HENDRYX & BARTHOLOMEW, OF SAME PLACE.

IMPROVEMENT IN METAL KNOBS.

Specification forming part of Letters Patent No. 190,855, dated May 15, 1877; application filed April 21, 1877.

*To all whom it may concern:*

Be it known that I, ANDREW B. HENDRYX, of Ansonia, in the county of New Haven and State of Connecticut, have invented a new Improvement in Metal Knobs; and I do hereby declare the following, when taken into connection with the accompanying drawings and the letters of reference marked thereon, to be a full, clear, and exact description of the same, and which said drawings constitute part of this specification, and represent, in—

Figure 1, a sectional side view, and in Fig. 2 the screw detached.

This invention relates to an improvement in the manufacture of that class of sheet-metal knobs which are provided with a shank for attachment, with special reference to the knobs used for stove-work, but applicable to other purposes.

It consists in a knob the neck of which is divided, the one part shouldered upon the other, the outer part constructed to receive the head end of the shank and prevent its turning, the inner part or base provided with a nut threaded to correspond with the thread of the shank, and so that through said nut the two parts are firmly bound together, and the shank or screw also firmly held in its position, as more fully hereinafter described.

The head or ball of the knob is formed, in the usual manner, of two parts, $a$ $b$, the one part overlapping the other, as at $c$, to unite the two parts. The inner or lower part $a$ is formed with a shoulder, $d$, and its end $e$ perforated to correspond to the neck $f$ of the shank $g$. The shank $g$ is inserted through the perforation in the end $e$ before the two parts $a$ and $b$ are closed together. A suitably-shaped head on the shank forms a bearing upon the inside of the end $e$, to prevent the shank from being drawn out.

The lower part or base $h$ is constructed to correspond at its outer end to the shoulder $d$, and so as to take a bearing thereon. This part $h$ has attached to or formed on it a nut, $i$, and the shank and nut are correspondingly threaded; hence, by screwing the part $h$ onto the shank until the part $h$ comes to a firm bearing on the shoulder, or against the other part, $a$, the shank serves as a bolt to securely bind the parts together. The shape of the shank and perforation in the end $e$ prevents the shank from turning while the part $h$ is being screwed thereon. Thus united, the shank is more firmly attached to the knob than can be done by brazing or soldering, and no liability exists of the parts becoming disarranged.

Generally, the shank is threaded throughout, so as to form a screw as a convenient means of attachment.

It will be understood that the parts $a$ $b$ $h$ are formed from sheet metal, in the usual manner for similar work.

I claim—

In a knob substantially such as described, the threaded shank attached to the outer or ball portion of the knob, to prevent them from turning one upon the other, combined with the base seated upon the ball portion, and the nut forming a part of said base, threaded to correspond with the thread of said shank, all substantially as described.

ANDREW B. HENDRYX.

Witnesses:
HARRY E. HENDRYX,
EMERSON L. BABBITT.